(12) United States Patent
Kohen et al.

(10) Patent No.: US 11,180,223 B1
(45) Date of Patent: Nov. 23, 2021

(54) ROLLER MOUNT FOR MARINE SEAT

(71) Applicants: Robert M. Kohen, Tampa, FL (US);
Kirk Owens, Merritt Island, FL (US)

(72) Inventors: Robert M. Kohen, Tampa, FL (US);
Kirk Owens, Merritt Island, FL (US)

(*) Notice: Subject to any disclaimer, the term of this patent is extended or adjusted under 35 U.S.C. 154(b) by 0 days.

(21) Appl. No.: 16/987,951

(22) Filed: Aug. 7, 2020

(51) Int. Cl.
*B63B 29/04* (2006.01)

(52) U.S. Cl.
CPC ........ *B63B 29/04* (2013.01); *B63B 2029/043* (2013.01)

(58) Field of Classification Search
CPC .......................... B63B 29/04; B63B 2029/043
See application file for complete search history.

(56) References Cited

U.S. PATENT DOCUMENTS

| | | | | |
|---|---|---|---|---|
| 1,414,637 A * | 5/1922 | Gell | ...................... | B60N 2/2209 297/343 |
| 1,615,120 A * | 1/1927 | Fischer | ................... | E05B 83/02 292/38 |
| 2,389,315 A * | 11/1945 | Kerr | ........................ | E05B 77/12 292/21 |
| 2,486,460 A * | 11/1949 | Bonenberger | ...... | E05B 65/0003 292/34 |
| 2,647,558 A * | 8/1953 | Rappl | ................... | B60N 2/0232 248/430 |
| 2,932,212 A * | 4/1960 | Herr, Jr. | ................... | F16H 63/36 74/473.24 |
| 3,113,804 A * | 12/1963 | Ritter | ...................... | B63B 29/06 297/252 |
| 3,260,870 A * | 7/1966 | Beach, Jr. | ................ | G11B 5/54 310/14 |
| 3,405,794 A * | 10/1968 | Means | ..................... | B41J 19/74 400/161.4 |
| 3,637,277 A * | 1/1972 | Krug | ................... | E05B 65/0082 312/217 |
| 3,821,825 A * | 7/1974 | Bailey | ..................... | B63B 29/04 114/363 |

(Continued)

FOREIGN PATENT DOCUMENTS

WO    WO2010137970    12/2010

*Primary Examiner* — S. Joseph Morano
*Assistant Examiner* — Jovon E Hayes
(74) *Attorney, Agent, or Firm* — Andrew W. Ludy (57) ABSTRACT

A roller mount for seats is used in connection with a boat and a seat. First and second base slides are mounted spaced apart on a base plate. The base slides have longitudinal rack gears. First and second top slides are mounted for linear movement on the base slides in a longitudinal direction, on a plurality of rollers. A top plate is mounted on the top slides to support the seat. First and second detent plates have longitudinal top rack gears, for selective releasable engagement with the base rack gears to preclude movement of the top slides. First and second locking bars extend longitudinally adjacent the base rack gears. The top rack gears include locking slots extending longitudinally for engagement with the locking bars, to guide the top rack gears into engagement with the base rack gears. The base rack gears and the top rack gears have teeth extending upward and inward at an angle with the base plane. The downward vector force created by the angle will eliminate backlash between the locking bar and the locking slot.

22 Claims, 9 Drawing Sheets

(56) References Cited

U.S. PATENT DOCUMENTS

| | | | | |
|---|---|---|---|---|
| 3,827,543 A * | 8/1974 | Kawano | ............... | B41J 1/40 400/161.3 |
| 3,910,611 A * | 10/1975 | Slovensky, Jr. | ....... | E05B 53/003 292/38 |
| 4,378,927 A * | 4/1983 | Graves | ............ | B60N 2/0715 248/561 |
| 4,594,909 A * | 6/1986 | Yamaguchi | ........... | B62D 1/183 280/775 |
| 4,607,540 A * | 8/1986 | Kinoshita | ............ | B62D 1/184 74/493 |
| 4,660,885 A * | 4/1987 | Suhr | ............ | A47C 7/402 248/429 |
| 4,684,140 A * | 8/1987 | Olivieri | ............ | A63C 17/0086 280/11.26 |
| 4,765,582 A * | 8/1988 | Babbs | ............ | B60N 2/0232 248/394 |
| 5,094,121 A * | 3/1992 | von Kaler | ............ | F16H 3/083 74/335 |
| 5,893,676 A * | 4/1999 | Yamamoto | ............ | B62D 1/184 403/325 |
| 6,216,391 B1 * | 4/2001 | Garrett, Jr. | ............ | E05B 53/003 49/141 |
| 6,562,074 B2 * | 5/2003 | Gerbec | ............ | A61F 2/4611 623/17.15 |
| 6,691,970 B1 * | 2/2004 | Sutton, Sr. | ............ | B60N 2/062 248/425 |
| 6,966,858 B2 * | 11/2005 | Yoshida | ............ | F16H 7/0848 474/109 |
| 6,994,383 B2 * | 2/2006 | Morris | ............ | E05B 13/004 292/112 |
| 8,556,221 B2 * | 10/2013 | Kohen | ............ | B60N 2/24 248/430 |
| 9,464,863 B2 * | 10/2016 | Mather | ............ | F41C 23/14 |
| 10,040,173 B1 * | 8/2018 | Warth | ............ | B25B 1/125 |
| 10,220,731 B2 * | 3/2019 | Kume | ............ | B60N 2/0715 |
| 2004/0041387 A1 * | 3/2004 | Lutz | ............ | B62D 1/184 280/775 |
| 2004/0057786 A1 * | 3/2004 | Heiml | ............ | B62D 1/184 403/373 |
| 2009/0218843 A1 * | 9/2009 | Wojatzki | ............ | B60N 2/0818 296/65.13 |
| 2012/0112032 A1 * | 5/2012 | Kohen | ............ | B60N 2/24 248/430 |

* cited by examiner

ROLLER MOUNT FOR MARINE SEAT

TECHNICAL FIELD

This invention relates to the field of sliding and rolling seat mounts, and more particularly to a rolling mount with a selective detent for use in connection with a boat seat.

BACKGROUND

It is desirable to be able to adjust a vehicle seat forward and backward in order to accommodate occupants of varying height. In the case of a boat, this is often necessary while underway, so that the driver can more easily slide out from behind the steering wheel to attend to an emergency issue, or allow another to drive. The seat must slide or roll freely, yet be held securely in any desired detent position. The detent must release easily, yet not be loosened by the motion of the boat in a seaway (rough water due to weather), and with a heavy driver. The detent must also be able to control backlash to limit the seat from rattling or vibrating in use. The roller mount must be able to withstand the rigors of marine service and a corrosive environment. A potential problem with relatively short, parallel tracks set apart is binding while sliding. Rolling element bearings properly deployed can prevent binding.

Marine seats, as well as all marine systems, must withstand forces generated by the six ship motions: roll (rotation about a longitudinal axis); pitch (rotation about a transverse axis); yaw (rotation about a vertical axis); surge (translation along a longitudinal axis); sway (translation along a transverse axis); and heave (translation along a vertical axis). Add to this, sudden acceleration down the face of a wave, or deceleration crashing into a wave.

Vehicle sliding and rolling seat mounts are known, and have taken a variety of configurations. Some examples in the prior art are as follows:

Beach, U.S. Pat. No. 3,260,870; discloses a permanent magnet 20 with rack teeth 21 that align with rack teeth 23 on detent member 10, as shown in FIG. 4. Opposed teeth do not engage, but are aligned magnetically upon energizing a coil.

Lutz, U.S. Publication No. US 2004/0041387; illustrates two toothed racks 42, 43 opposite each other. One tooth is displaceable against a spring-biasing force to align the racks for engagement. The displaceable tooth is unnecessary to the present disclosure, and no means is provided by Lutz to reduce or eliminate backlash.

Yamamoto, U.S. Pat. No. 5,893,676; shows teeth 16 arranged along a length of the rack 12. Teeth 18 are arranged along the rack 14. Spring 44 will bias the guide 40 to align the racks for engagement. The alignment guide 40 is unnecessary to the present disclosure, and no means is provided by Yamamoto to reduce or eliminate backlash.

None of the above devices have any provision to eliminate backlash in the system. None of the above devices have anti-friction bearings for relative movement of the opposed members. Alignment is automatic with the instant disclosure, as shown hereinbelow.

Accordingly, there is a need to provide a roller mount for seats that has rolling element support in both upward and downward vertical loading, and in left and right transverse loading.

There is a further need to provide a roller mount for seats of the type described and that exhibits no backlash in the case of two tracks spaced apart, each with a detent mechanism.

There is a yet further need to provide a roller mount for seats of the type described and that will withstand forces generated by the six ship motions in a seaway.

There is a still further need to provide a roller mount for seats of the type described and that is capable of mounting a double or triple width seat, and yet will not bind while sliding.

There is another need to provide a roller mount for seats of the type described and that can withstand the rigors of marine service and a corrosive environment.

There is yet another need to provide a roller mount for seats of the type described and that can be manufactured cost-effectively in large quantities of high quality.

SUMMARY

In one aspect, a roller mount for seats is used in connection with a boat and a seat. The roller mount has a central longitudinal axis. The roller mount for seats comprises a base plate adapted for mounting in the boat. A first base slide is mounted on the base plate and extends in a longitudinal direction. A second base slide is mounted on the base plate parallel to the first base slide, is spaced apart transversely from the first base slide, and extends in a longitudinal direction.

A first top slide is disposed above the first base slide. A second top slide is disposed above the second base slide. A top plate is mounted on the first and second top slides to support the seat. A plurality of rollers is disposed between the first top slide and the first base slide. A plurality of rollers is also disposed between the second top slide and the second base slide. Thus, linear movement of the top plate is allowed with respect to the base plate in a longitudinal direction.

A first base detent element has a first base rack gear integral with the first base slide. The first base rack gear extends in a longitudinal direction, and has teeth extending upward. A second base detent element has a second base rack gear integral with the second base slide. The second base rack gear extends in a longitudinal direction, and has teeth extending upward.

A first detent plate is juxtaposed with the top plate and mounted for transverse sliding movement toward the first base slide. The first detent plate has a first top detent element with a first top rack gear extending in a longitudinal direction and has teeth extending upward. The first top rack gear is adapted for selective releasable engagement with the first base rack gear. This will preclude movement of the first top slide with respect to the first base slide when the first top rack gear is engaged. This will also allow movement of the first top slide with respect to the first base slide when the first top rack gear is disengaged.

A second detent plate is juxtaposed with the top plate and mounted for transverse sliding movement toward the second base slide. The second detent plate has a second top detent element with a second top rack gear extending in a longitudinal direction and has teeth extending upward. The second top rack gear is adapted for selective releasable engagement with the second base rack gear. This will preclude movement of the second top slide with respect to the second base slide when the second top rack gear is engaged. This will also allow movement of the second top slide with respect to the second base slide when the second top rack gear is disengaged.

In another aspect, a roller mount for seats is used in connection with a boat and a seat. The roller mount has a central longitudinal axis. The roller mount for seats comprises a base plate adapted for mounting in the boat. A first base slide is mounted on the base plate. A second base slide is mounted on the base plate parallel to the first base slide and spaced apart from the first base slide.

A first base detent element has a first base rack gear integral with the first base slide. The first base rack gear extends in a longitudinal direction, and has teeth extending upward. A second base detent element has a second base rack gear integral with the second base slide. The second base rack gear extends in a longitudinal direction, and has teeth extending upward.

A first top slide is mounted for linear movement with respect to the first base slide in a longitudinal direction. A plurality of top rollers bears against the first top slide and is in rolling engagement with the first base slide. The top rollers are disposed bearing downward against the first base slide. In this manner, the top rollers resist downward forces against the first base slide. A plurality of side rollers bears against the first top slide and is in rolling engagement with the first base slide. The side rollers are disposed bearing transversely against the first base slide. In this manner, the side rollers resist transverse forces against the first base slide.

A second top slide is mounted for linear movement with respect to the second base slide in a longitudinal direction. A plurality of top rollers bears against the second top slide and is in rolling engagement with the second base slide. The top rollers are disposed bearing downward against the second base slide. In this manner, the top rollers resist downward forces against the second base slide. A plurality of side rollers bears against the second top slide and is in rolling engagement with the second base slide. The side rollers are disposed bearing transversely against the second base slide. In this manner, the side rollers resist transverse forces against the second base slide. A top plate is mounted on the first and second top slides. The top plate is adapted to support the seat.

A first detent plate is mounted for horizontal sliding movement toward the first base slide. The first detent plate has a first top detent element juxtaposed with the top plate. The first top detent element includes a first top rack gear integral with the first detent plate. The first top rack gear extends in a longitudinal direction, and has teeth extending upward. The first top rack gear is adapted for selective releasable engagement with the first base rack gear. This will preclude movement of the first top slide with respect to the first base slide when the first top rack gear is engaged. This will also allow movement of the first top slide with respect to the first base slide when the first top rack gear is disengaged.

A second detent plate is mounted for horizontal sliding movement toward the second base slide. The second detent plate has a second top detent element juxtaposed with the top plate. The second top detent element includes a second top rack gear integral with the second detent plate. The second top rack gear extends in a longitudinal direction, and has teeth extending upward. The second top rack gear is adapted for selective releasable engagement with the second base rack gear. This will preclude movement of the second top slide with respect to the second base slide when the second top rack gear is engaged. This will also allow movement of the second top slide with respect to the second base slide when the second top rack gear is disengaged.

These and other aspects, objectives, features, and advantages of the disclosed technologies will become apparent from the following detailed description of illustrative embodiments thereof, which is to be read in connection with the accompanying drawings.

BRIEF DESCRIPTION OF THE DRAWINGS

It should be noted that the drawings herein are not to scale.

DETAILED DESCRIPTION

As used herein, "longitudinal" refers to any line extending in a direction parallel to the forward-and-aft extending centerline of the boat.

As used herein, "central longitudinal axis" and "longitudinal axis" refers to a centerline of the roller mount for marine seat extending in a longitudinal direction.

As used herein, "transverse" or "athwart" refers to a direction crosswise, or perpendicular to the centerline of the boat, and horizontal.

As used herein, "transverse plane" refers to a plane extending vertically and transversely to the centerline of the boat.

As used herein, "base plane" refers to a plane extending horizontally.

As used herein, "right" or "starboard" refers to the right-hand side of the boat from the vantage of a passenger facing forward.

As used herein, "left" or "port" refers to the left-hand side of the boat from the vantage of a passenger facing forward.

Figure 1:
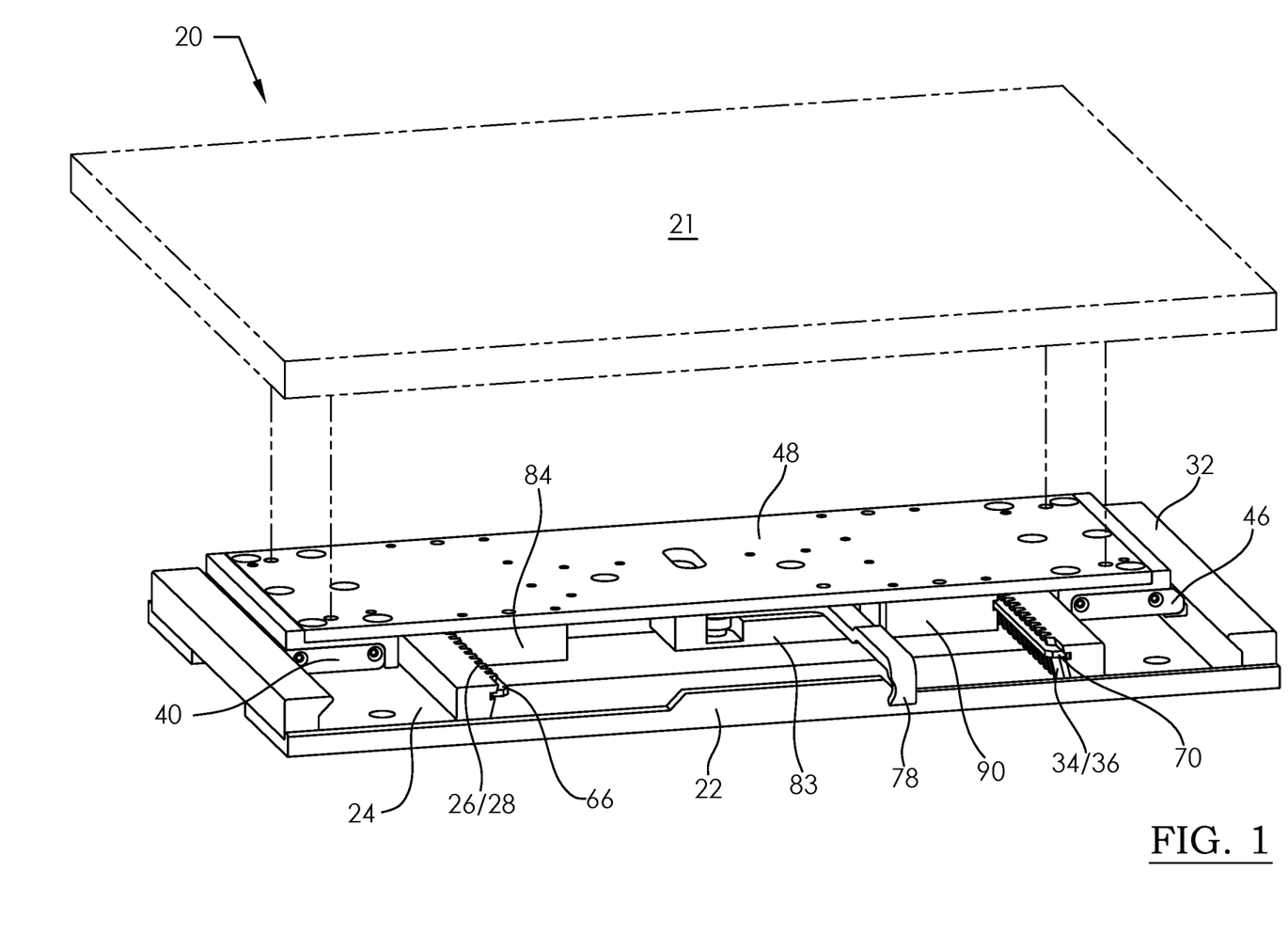
FIG. 1 is a front perspective assembly view of a roller mount for marine seat constructed in accordance with the invention.
Figure 2:
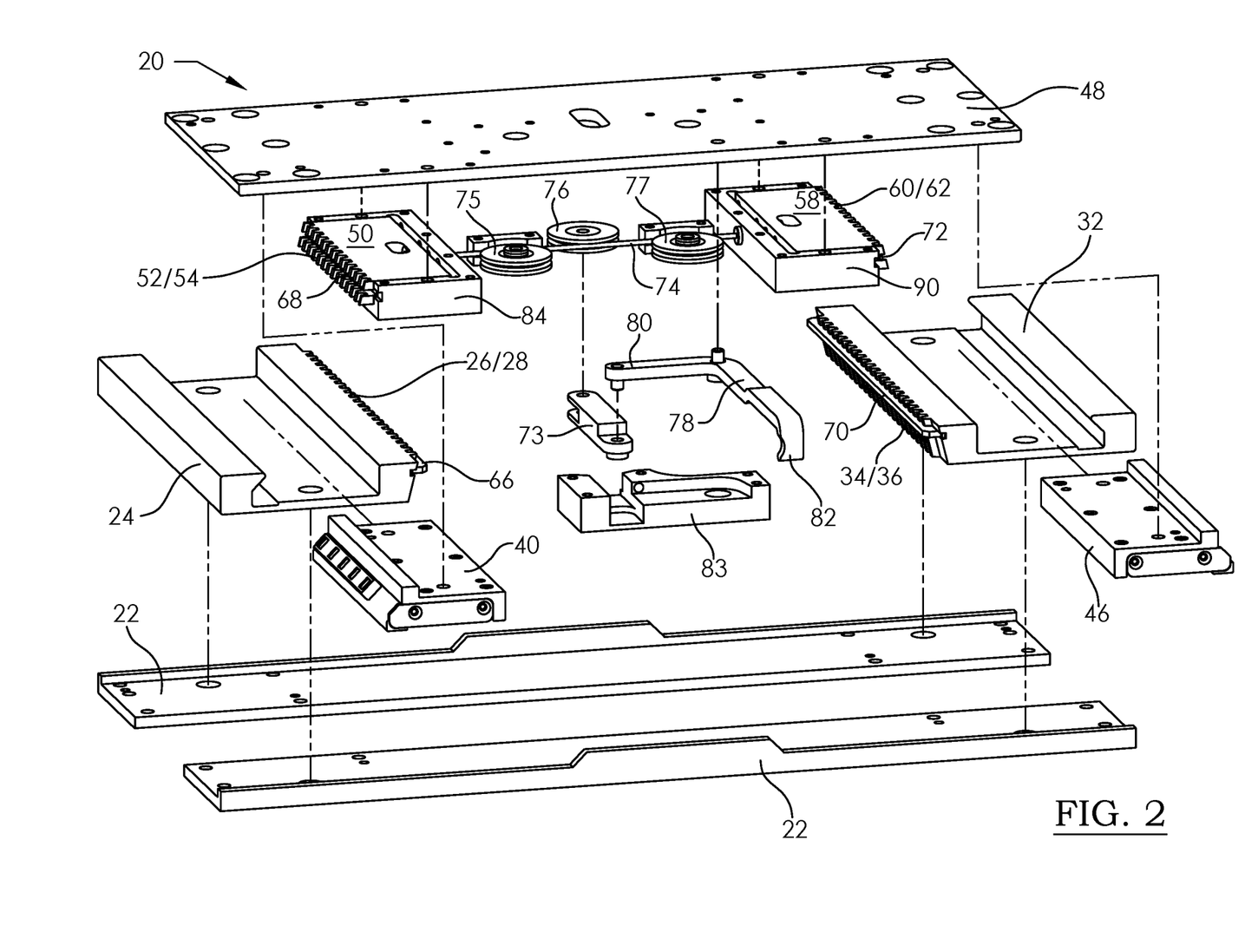
FIG. 2 is an exploded, front perspective assembly view of the roller mount for marine seat of FIG. 1.

Describing now in further detail these exemplary embodiments with reference to the Figures as described above, the roller mount for seats 20 is typically used in connection with a boat and a seat (not shown). The boat seat has a bottom mounting panel 21 shown in phantom in FIG. 1. The roller mount 20 has a central longitudinal axis. The roller mount for seats 20 comprises a base plate 22 adapted for mounting in the boat. A first base slide 24 is mounted on the base plate 22 and extends in a longitudinal direction. A second base slide 32 is mounted on the base plate 22 parallel to the first base slide 24, is spaced apart transversely from the first base slide 24, and extends in a longitudinal direction.

Figure 13:
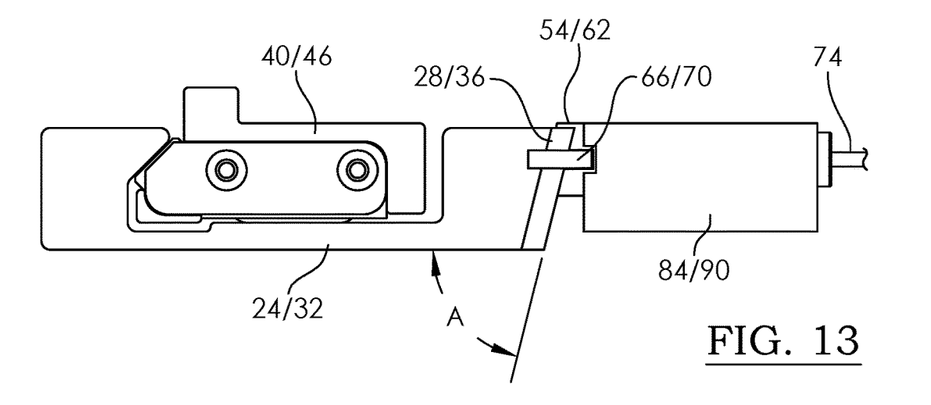
FIG. 13 is an enlarged, partial front elevational view of the roller mount for marine seat of FIG. 1, taken along lines 13-13 of FIG. 3.

A first base detent element 26 has a first base rack gear 28 integral with the first base slide 24. The first base rack gear 28 extends in a longitudinal direction, and has teeth 30 extending upward and inward toward the longitudinal axis at a primary predetermined angle "A" with the base plane, as shown in FIG. 13. The primary predetermined angle "A" can be any angle, and is to be considered non-limiting.

A second base detent element 34 has a second base rack gear 36 integral with the second base slide 32. The second base rack gear 36 extends in a longitudinal direction, and has teeth 38 extending upward and inward toward the longitudinal axis at the primary predetermined angle "A" with the base plane.

Figure 14:
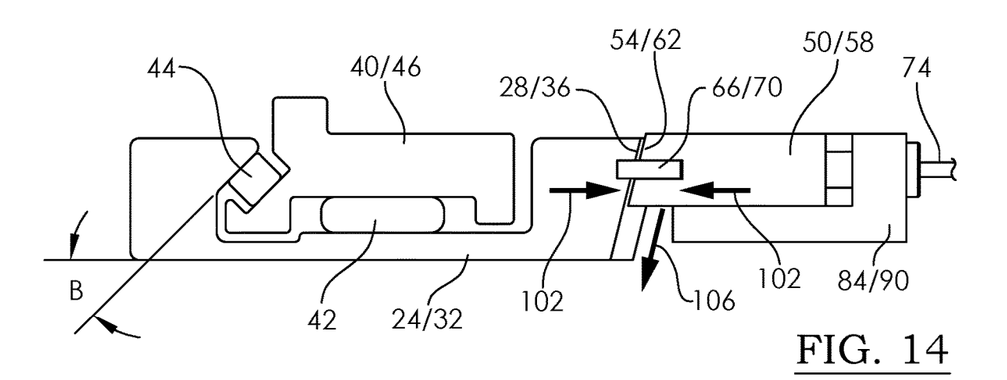
FIG. 14 is an enlarged, partial front elevational sectional view of the roller mount for marine seat of FIG. 1, taken along lines 14-14 of FIG. 3, and showing the mount detents engaged.

A first top slide 40 is mounted for linear movement with respect to the first base slide 24 in a longitudinal direction. A plurality of top rollers 42 bears against the first top slide 40 and is in rolling engagement with the first base slide 24. The top rollers 42 are disposed bearing downward against the first base slide 24. In this manner, the top rollers 42 resist downward forces against the first base slide 24. A top cage 43 contains the top rollers 42 and maintains proper roller alignment. A plurality of side rollers 44 bears against the first top slide 40 and is in rolling engagement with the first base slide 24. The side rollers 44 are disposed bearing transversely against the first base slide 24. The side rollers 44 extend upward and inward toward the longitudinal axis at a secondary predetermined angle "B" with the base plane for rolling contact between the first top slide 40 and the first base slide 24, as shown in FIG. 14. Thus, the side rollers 44 resist transverse forces and upward forces against the first base slide 24. The secondary predetermined angle "B" can be any angle, and is to be considered non-limiting. A side cage 45 contains the side rollers 44 and maintains proper roller alignment. End plates 47 prevent the top cage 43 and top rollers 42 from rolling off the first top slide 40.

A second top slide 46 is mounted for linear movement with respect to the second base slide 32 in a longitudinal direction. A plurality of top rollers 42 bears against the second top slide 46 and is in rolling engagement with the second base slide 32. The top rollers 42 are disposed bearing downward against the second base slide 32. In this manner, the top rollers 42 resist downward forces against the second base slide 32. A top cage 43 contains the top rollers 42 and maintains proper roller alignment. A plurality of side rollers 44 bears against the second top slide 46 and is in rolling engagement with the second base slide 32. The side rollers 44 are disposed bearing transversely against the second base slide 32. The side rollers 44 extend upward and inward toward the longitudinal axis at the secondary predetermined angle "B" with the base plane for rolling contact between the second top slide 46 and the second base slide 32. Thus, the side rollers 44 resist transverse forces and upward forces against the second base slide 32. A side cage 45 contains the side rollers 44 and maintains proper roller alignment. End plates 47 prevent the top cage 43 and top rollers 42 from rolling off the second top slide 46. A top plate 48 is mounted on the first 40 and second 46 top slides. The top plate 48 is adapted to support the seat.

Figure 15:
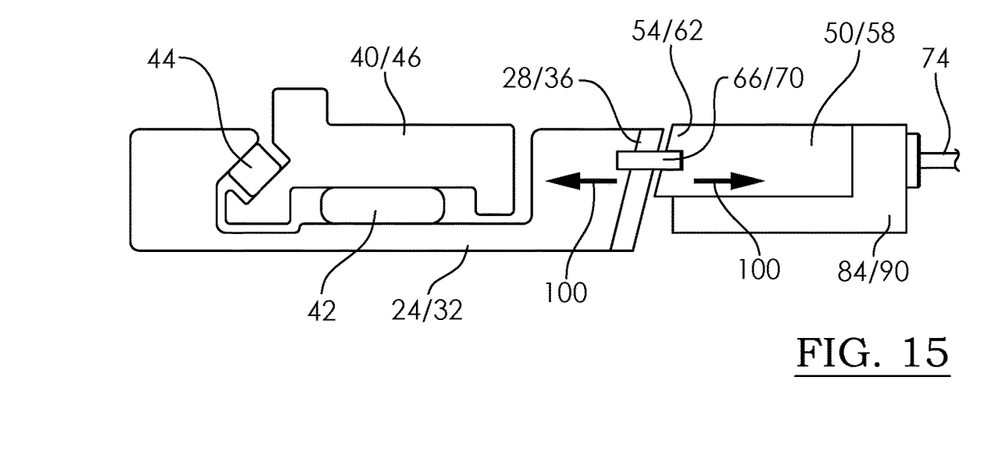
FIG. 15 is an enlarged, partial front elevational sectional view of the roller mount for marine seat of FIG. 1, taken along lines 15-15 of FIG. 5, and showing the mount detents disengaged.
Figure 16:
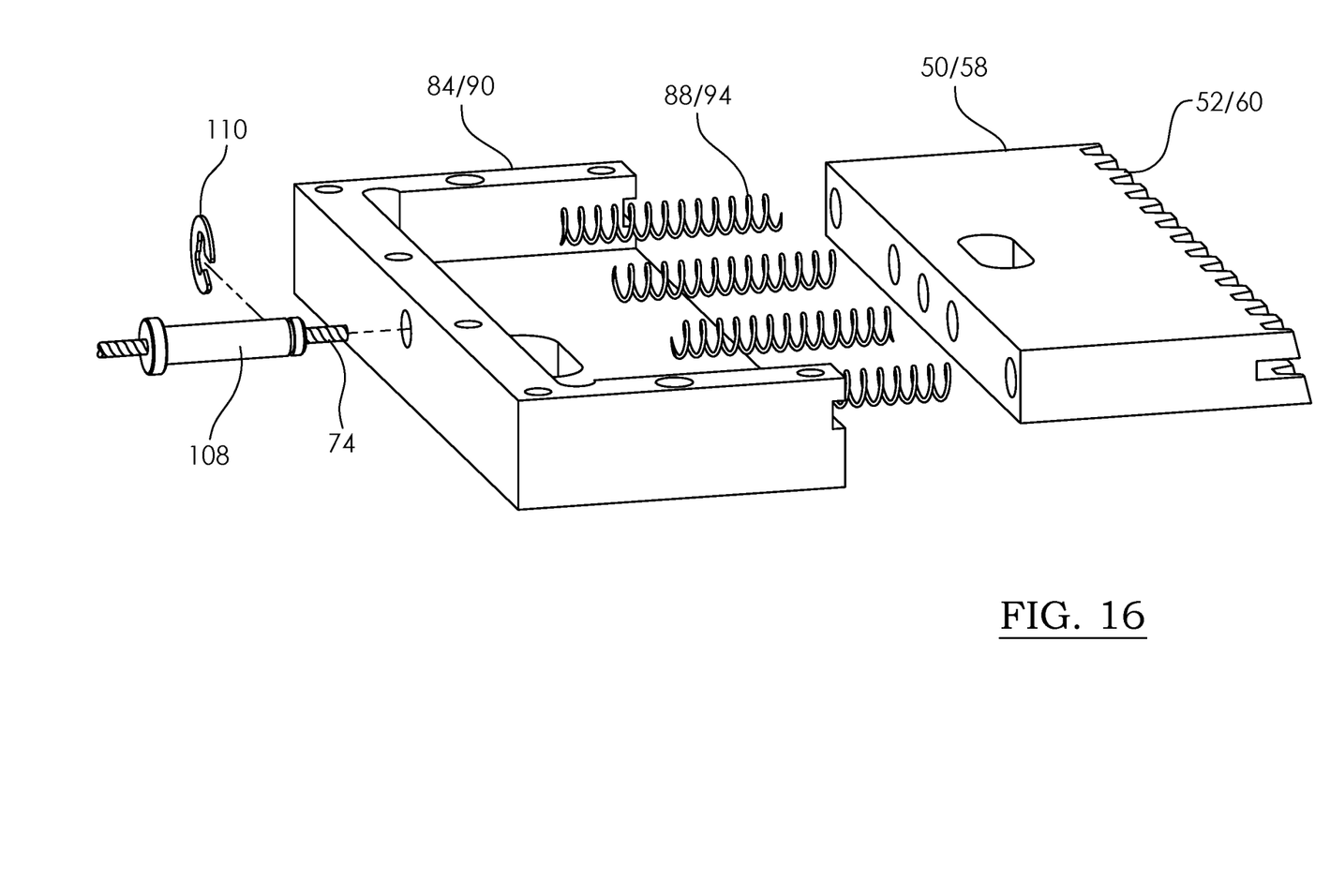
FIG. 16 is a front perspective exploded assembly view of the first and second housings, detent plates, and detent springs for use with the roller mount for marine seat of FIG. 1.

A first detent plate 50 is mounted for horizontal sliding movement toward the first base slide 24. The first detent plate 50 has a first top detent element 52 juxtaposed with the top plate 48. The first top detent element 52 includes a first top rack gear 54 integral with the first detent plate 50. The first top rack gear 54 extends in a longitudinal direction, and has teeth 56 extending upward and inward toward the longitudinal axis at the primary predetermined angle "A" with the base plane. The first top rack gear 54 is adapted for selective releasable engagement with the first base rack gear 28. This will preclude movement of the first top slide 40 with respect to the first base slide 24 when the first top rack gear 54 is engaged, as shown by arrows 102 in FIG. 14. This will also allow movement of the first top slide 40 with respect to the first base slide 24 when the first top rack gear 54 is disengaged, as shown by arrows 100 in FIG. 15. The first base rack gear teeth 30 and the first top rack gear teeth 56 will engage horizontally, causing a downward vector force to be generated by the primary predetermined angle "A", thereby eliminating backlash between the first top detent element and the first base detent element. The downward vector force is shown by arrow 106 in FIG. 14.

A second detent plate 58 is mounted for horizontal sliding movement toward the second base slide 32. The second detent plate 58 has a second top detent element 60 juxtaposed with the top plate 48. The second top detent element 60 includes a second top rack gear 62 integral with the second detent plate 58. The second top rack gear 62 extends in a longitudinal direction, and has teeth 64 extending upward and inward toward the longitudinal axis at the primary predetermined angle "A" with the base plane, as shown in FIG. 13. The second top rack gear 62 is adapted for selective releasable engagement with the second base rack gear 36. This will preclude movement of the second top slide 46 with respect to the second base slide 32 when the second top rack gear 62 is engaged. This will also allow movement of the second top slide 46 with respect to the second base slide 32 when the second top rack gear 62 is disengaged. The second base rack gear teeth 38 and the second top rack gear teeth 64 will engage horizontally, causing a downward vector force to be generated by the primary predetermined angle "A", thereby eliminating backlash between the second top detent element 60 and the second base detent element 34.

A first locking bar 66 extends longitudinally adjacent the first base rack gear 28. The first top rack gear 54 includes a first locking slot 68 extending longitudinally and adapted for engagement with the first locking bar 66, to guide the first top rack gear teeth 56 into engagement with the first base rack gear teeth 30. Hence, the downward vector force 106 will eliminate backlash between the first locking bar 66 and the first locking slot 68.

A second locking bar 70 extends longitudinally adjacent the second base rack gear 36. The second top rack gear 62 includes a second locking slot 72 extending longitudinally and adapted for engagement with the second locking bar 70, to guide the second top rack gear teeth 64 into engagement with the second base rack gear teeth 38. Hence, the downward vector force 106 will eliminate backlash between the second locking bar 70 and the second locking slot 72.

A release cable 74 extends between the first 50 and second 58 detent plates. A ferrule 108 anchors each end of the release cable 74. A snap ring 110 secures the ferrule 108. A central pulley 76 is mounted for engagement with the release cable 74. A release handle 78 has a proximal end 80 attached to the release cable 74, and preferably attached to the central pulley 76. A link 73 typically is interposed between the release handle 78 and the central pulley 76 to couple the parts and aid in pulling the cable. A first pulley 75 and a second pulley 77 flank the central pulley 76 to maintain the cable pulling transversely on the first 50 and second 58 detent plates. The release handle 78 extends to a distal end 82 projecting outward from the roller mount 20 and adapted for manual grasping. The release handle 78 is mounted for movement on a one of the base plate 22 and the top plate 48. The release handle 78 is preferably mounted for pivotal movement on the top plate 48. A guide block 83 encloses the release handle 78 to maintain alignment and provide a low friction sliding surface. The release handle 78 will be manually grasped and pivoted, and the central pulley 76 will pull the release cable 74. The first top detent element 52 will be disengaged with the first base detent element 26. The second top detent element 60 will be disengaged with the second base detent element 34. This will allow the seat to be moved.

The guide block 83, first pulley 75, second pulley 77, central pulley 76, first detent plate 50, second detent plate 58, as well as various bushings, are preferably constructed of Acetal (polyoxymethylene) resin for high strength, low friction, and hydrophobic properties. This is to be considered non-limiting, as many materials are suitable.

A first housing 84 is attached to the top plate 48. The first housing 84 includes a pocket 86. The first detent plate 50 is received in the pocket 86 for sliding movement transversely toward the first base slide 24. This will allow selective engagement and disengagement of the first top detent element 52 with the first base detent element 26. At least one, and typically a plurality of first detent springs 88 is disposed between the first housing 84 and the first detent plate 50. The first detent springs 88 will bias the first top detent element 52 toward the first base detent element 26.

A second housing 90 is attached to the top plate 48. The second housing 90 includes a pocket 92. The second detent plate 58 is received in the pocket 92 for sliding movement transversely toward the second base slide 32. This will allow selective engagement and disengagement of the second top detent element 60 with the second base detent element 34. At least one, and typically a plurality of second detent springs 94 is disposed between the second housing 90 and the second detent plate 58. The second detent springs 94 will bias the second top detent element 60 toward the second base detent element 34.

Figure 3:
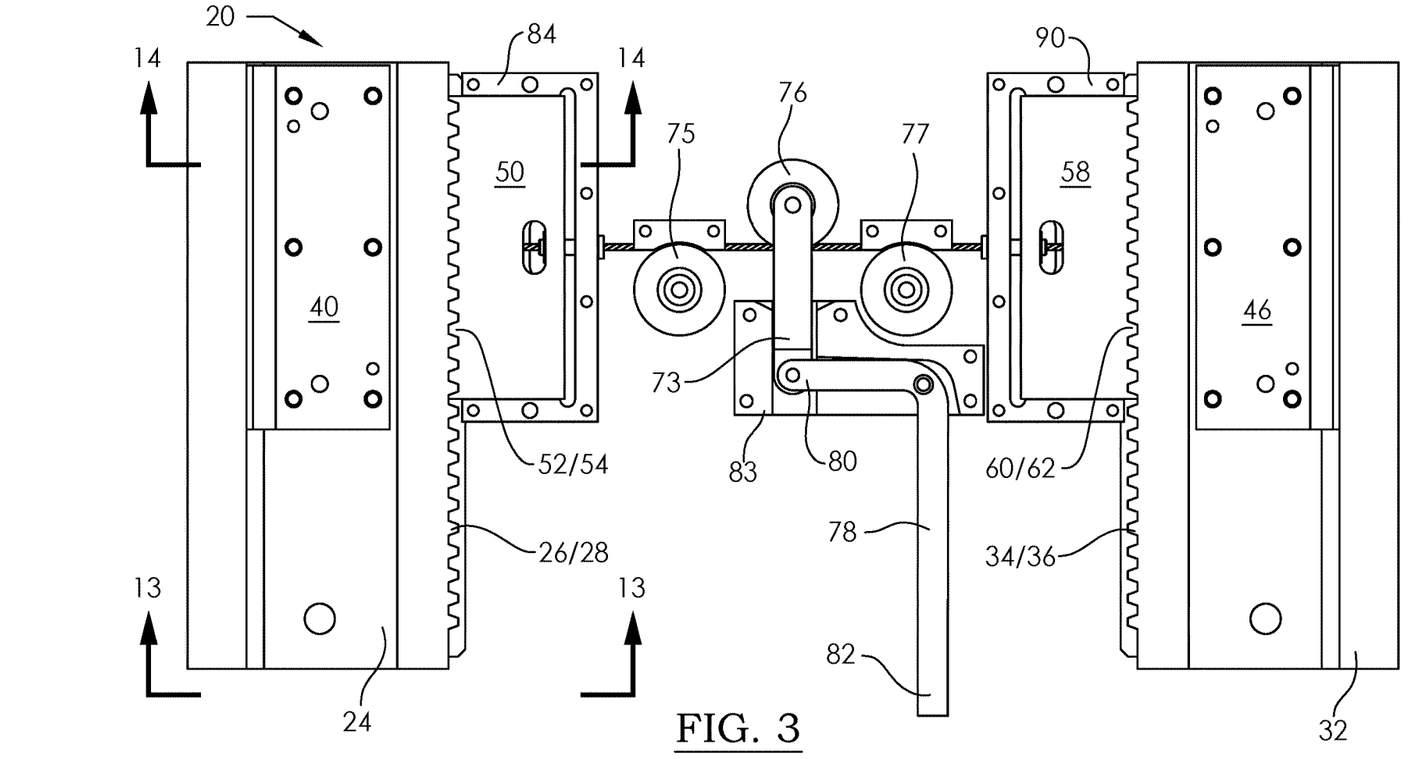
FIG. 3 is a top plan view of the roller mount for marine seat of FIG. 1, with the top plate and bottom angles removed for clarity, and showing the mount in a first position and the detents engaged.
Figure 4:
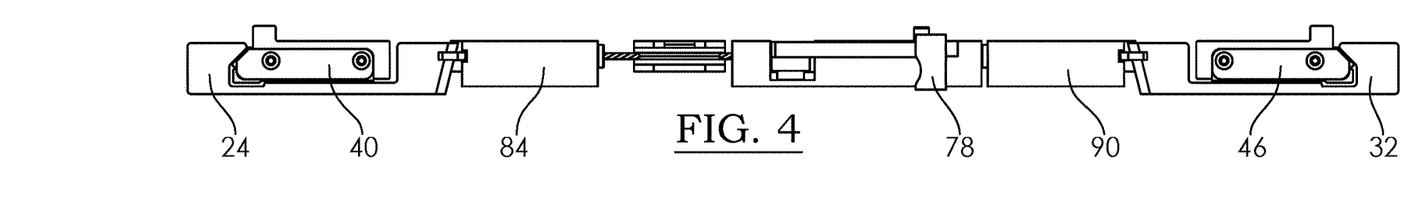
FIG. 4 is a front elevational view of FIG. 3.
Figure 5:
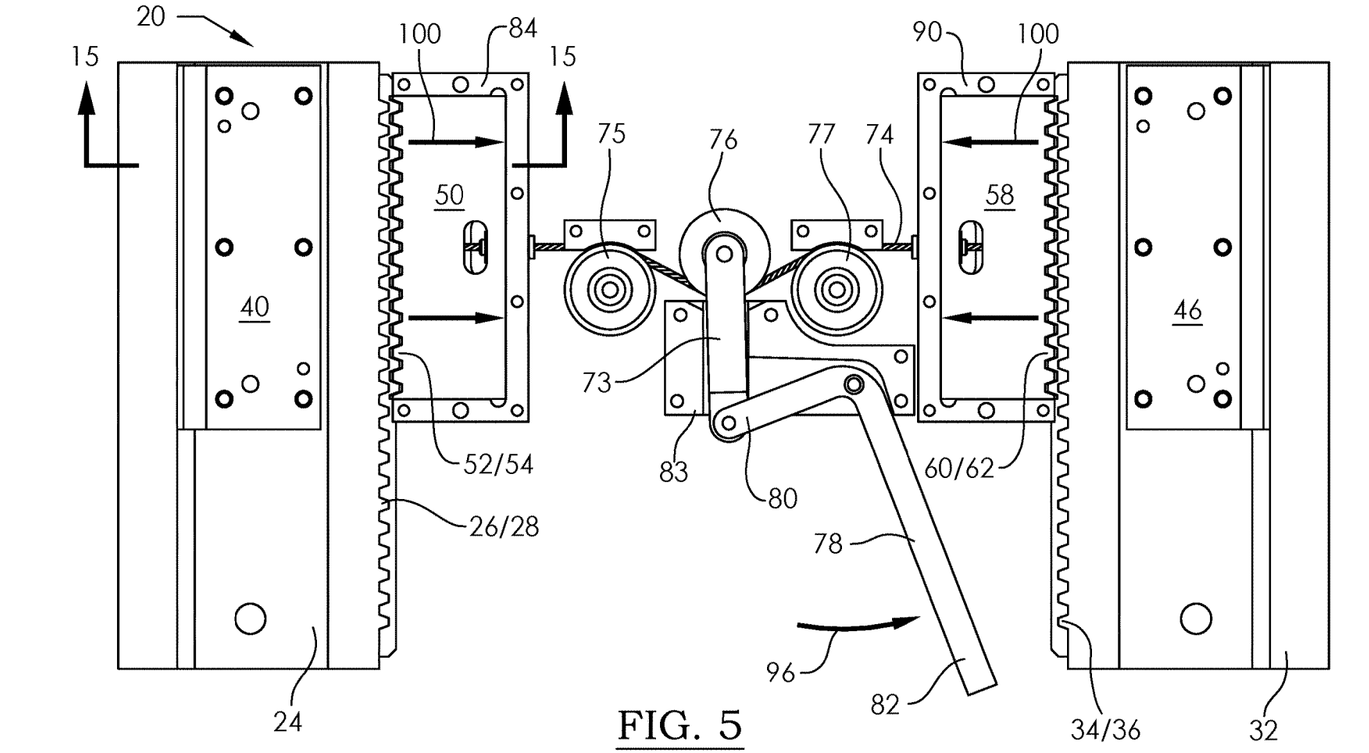
FIG. 5 is a top plan view of the roller mount for marine seat of FIG. 1, with the top plate and bottom angles removed for clarity, and showing the mount in a first position and the detents disengaged.
Figure 6:
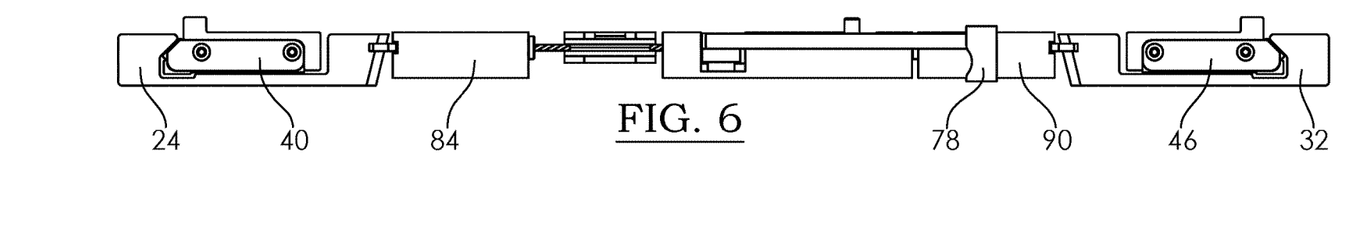
FIG. 6 is a front elevational view of FIG. 5.
Figure 7:
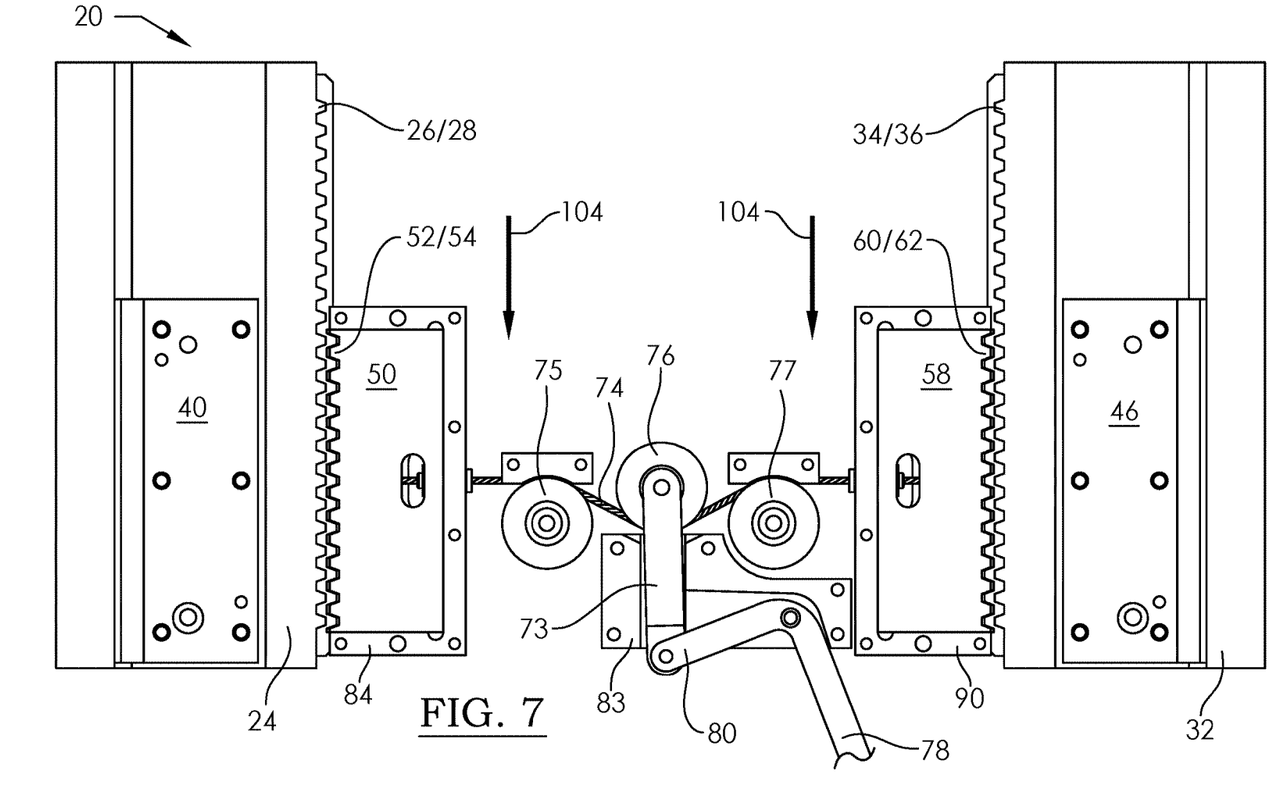
FIG. 7 is a top plan view of the roller mount for marine seat of FIG. 1, with the top plate and bottom angles removed for clarity, and showing the mount in a second position and the detents disengaged.
Figure 8:
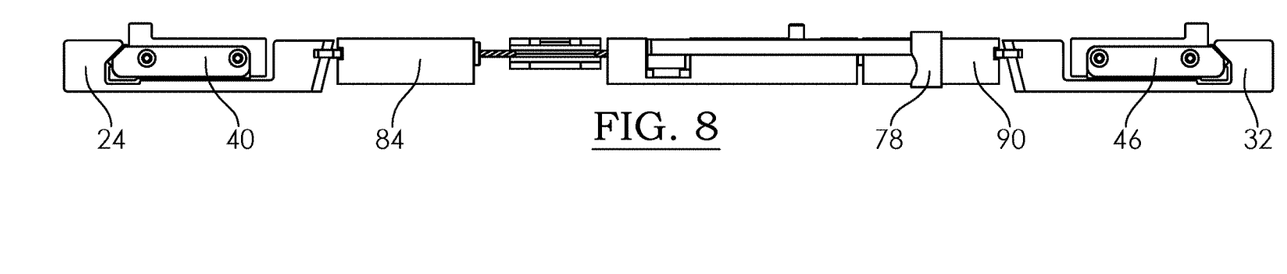
FIG. 8 is a front elevational view of FIG. 7.
Figure 9:
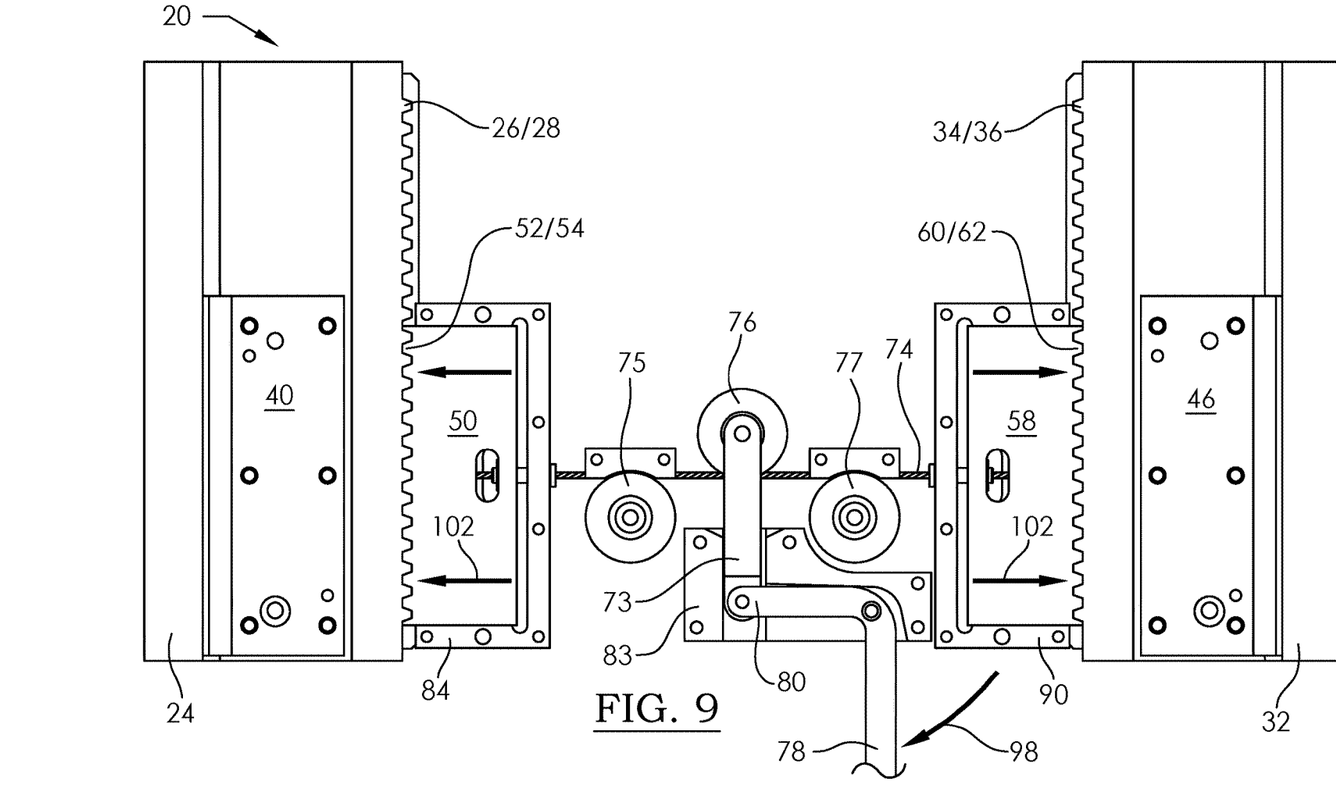
FIG. 9 is a top plan view of the roller mount for marine seat of FIG. 1, with the top plate and bottom angles removed for clarity, and showing the mount in a second position and the detents engaged.
Figure 10:
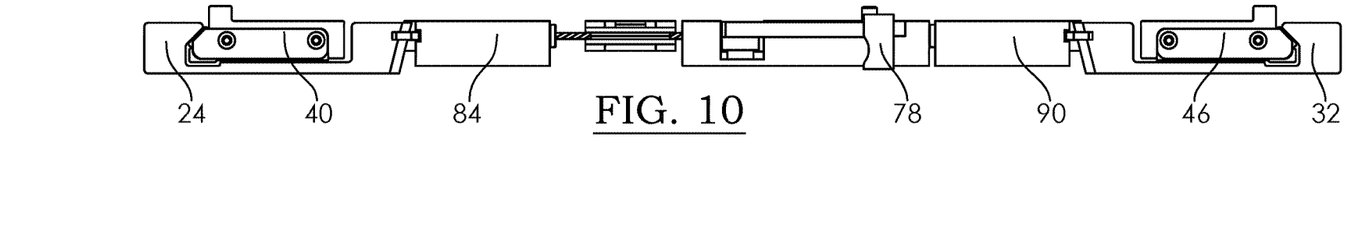
FIG. 10 is a front elevational view of FIG. 9.
Figure 11:
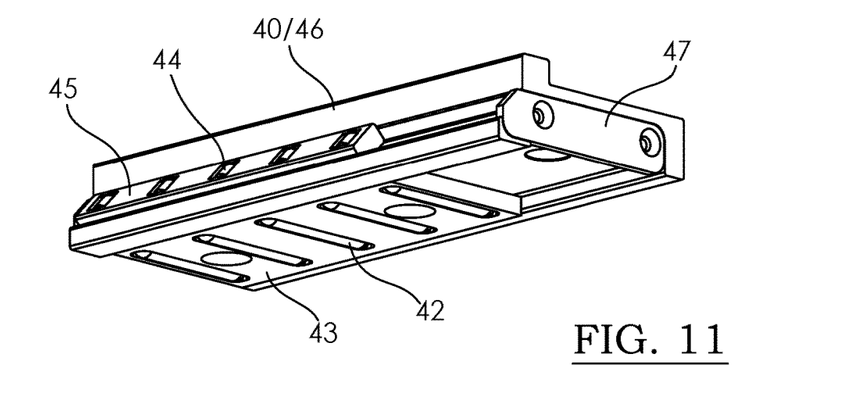
FIG. 11 is a front perspective contracted assembly view of a top slide for use with the roller mount for marine seat of FIG. 1.
Figure 12:
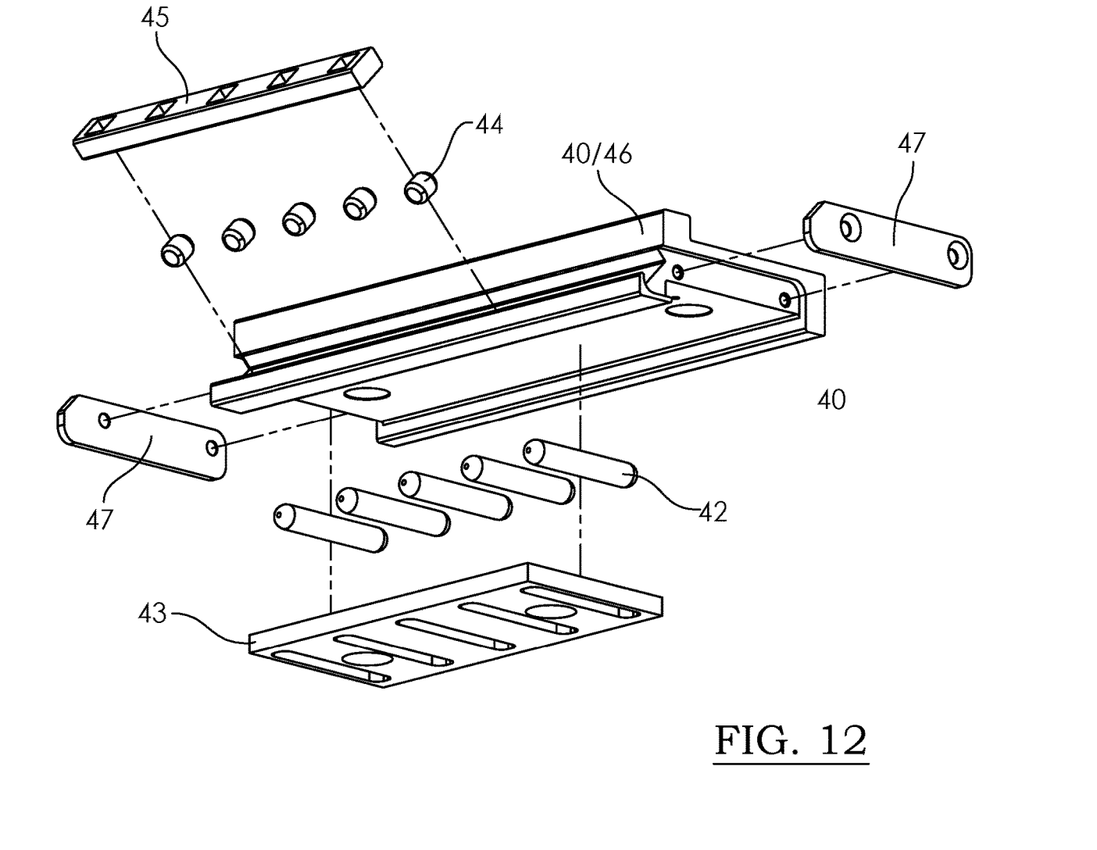
FIG. 12 is a front perspective exploded assembly view of the top slide for use with the roller mount for marine seat of FIG. 1.

Referring now to FIGS. 3-10, in which the top plate 48 and base plate 22 have been removed for clarity, the operation of the roller mount for seats 20 is disclosed. In FIG. 3, the roller mount 20 is positioned as far to the rear as possible. The first top detent element 52 is engaged with the first base detent element 26, and the second top detent element 60 is engaged with the second base detent element 34. In FIG. 5, the release handle distal end 82 is manually grasped and pivoted transversely in the direction of arrow 96. The central pulley 76 pulls the release cable 74, moving the first top detent element 52 out of engagement with the first base detent element 26, and moving the second top detent element 60 out of engagement with the second base detent element 34, as shown by arrows 100. In FIG. 7, with the detents disengaged, the roller mount 20 is moved forward as far as possible, as shown by arrows 104. In FIG. 9, the release handle distal end 82 is released and pivots back in the direction of arrow 98. The central pulley 76 relaxes the release cable 74. The first 88 and second 94 detent springs (not shown) push the first 50 and second 58 detent plates outward. The first top detent element 52 is once again engaged with the first base detent element 26, and the second top detent element 60 is engaged with the second base detent element 34. The roller mount for seats 20 is now secured in the new position, and will not move.

It will be appreciated that variants of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The embodiments of the invention in which an exclusive property or privilege is claimed are defined as follows:

1. A roller mount for seats for use in connection with a boat and a seat, the roller mount having a central longitudinal axis, the roller mount for seats comprising:
    a base plate, the base plate being adapted for mounting in the boat;
    a first base slide mounted on the base plate and extending in a longitudinal direction;
    a second base slide mounted on the base plate parallel to the first base slide and spaced apart transversely from the first base slide and extending in a longitudinal direction;
    a first top slide disposed above the first base slide;
    a second top slide disposed above the second base slide;
    a top plate mounted on the first and second top slides, the top plate being adapted to support the seat;
    a plurality of rollers disposed between the first top slide and the first base slide, and between the second top slide and the second base slide so as to allow linear movement of the top plate with respect to the base plate in a longitudinal direction;
    a first base detent element having a first base rack gear integral with the first base slide, the first base rack gear extending in a longitudinal direction, the first base rack gear having teeth extending upward;
    a second base detent element having a second base rack gear integral with the second base slide, the second base rack gear extending in a longitudinal direction, the second base rack gear having teeth extending upward;
    a first detent plate juxtaposed with the top plate and mounted for transverse sliding movement toward the first base slide, the first detent plate having a first top detent element with a first top rack gear extending in a longitudinal direction and having teeth extending upward, the first top rack gear being adapted for selective releasable engagement with the first base rack gear, so as to preclude movement of the first top slide with respect to the first base slide when the first top rack gear is engaged, and to allow movement of the first top slide with respect to the first base slide when the first top rack gear is disengaged; and
    a second detent plate juxtaposed with the top plate and mounted for transverse sliding movement toward the second base slide, the second detent plate having a second top detent element with a second top rack gear extending in a longitudinal direction and having teeth extending upward, the second top rack gear being adapted for selective releasable engagement with the second base rack gear, so as to preclude movement of the second top slide with respect to the second base slide when the second top rack gear is engaged, and to allow movement of the second top slide with respect to the second base slide when the second top rack gear is disengaged.

2. The roller mount for seats of claim 1, wherein:

the first base rack gear teeth extend upward and inward toward the longitudinal axis at a primary predetermined angle with a base plane;

the first top rack gear teeth extend upward and inward toward the longitudinal axis at the primary predetermined angle with the base plane;

the second base rack gear teeth extend upward and inward toward the longitudinal axis at a primary predetermined angle with the base plane; and the second top rack gear teeth extend upward and inward toward the longitudinal axis at the primary predetermined angle with the base plane; wherein the first base rack gear teeth and the first top rack gear teeth will engage horizontally, causing a downward vector force to be generated by the primary predetermined angle, thereby eliminating backlash between the first top detent element and the first base detent element; and the second base rack gear teeth and the second top rack gear teeth will engage horizontally, causing a downward vector force to be generated by the primary predetermined angle, thereby eliminating backlash between the second top detent element and the second base detent element.

3. The roller mount for seats of claim 2, further comprising:

a first locking bar extending longitudinally adjacent the first base rack gear;

the first top rack gear includes a first locking slot extending longitudinally and adapted for engagement with the first locking bar, so as to guide the first top rack gear teeth into engagement with the first base rack gear teeth, whereby the downward vector force will eliminate backlash between the first locking bar and the first locking slot;

a second locking bar extending longitudinally adjacent the second base rack gear; and the second top rack gear includes a second locking slot extending longitudinally and adapted for engagement with the second locking bar, so as to guide the second top rack gear teeth into engagement with the second base rack gear teeth, whereby the downward vector force will eliminate backlash between the second locking bar and the second locking slot.

4. The roller mount for seats of claim 3, further comprising:

a release cable extending between the first and second detent plates;

a central pulley mounted for engagement with the release cable;

a release handle mounted for pivotal movement on the top plate, the release handle extending from a proximal end attached to the central pulley to a distal end projecting outward from the roller mount and adapted for manual grasping, wherein the release handle will be manually grasped and pivoted, the central pulley will pull the release cable, the first and second top detent elements will be disengaged with the first and second base detent elements respectively, so as to allow the seat to be moved.

5. A roller mount for seats for use in connection with a boat and a seat, the roller mount having a central longitudinal axis, the roller mount for seats comprising:

a base plate, the base plate being adapted for mounting in the boat;

at least one first base slide mounted on the base plate and extending in a longitudinal direction;

a first base detent element juxtaposed with the base plate;

at least one first top slide adapted for engagement with the first base slide, the first top slide being adapted for movement in a longitudinal direction;

a plurality of top rollers bearing against the first top slide for rolling engagement with the first base slide, the top rollers being disposed bearing downward against the first base slide, so as to resist downward forces against the first base slide;

a plurality of side rollers bearing against the first top slide for rolling engagement with the first base slide, the side rollers being disposed bearing transversely against the first base slide, so as to resist transverse forces against the first base slide;

a top plate mounted on the first top slide, the top plate being adapted to support the seat;

a first detent plate juxtaposed with the top plate; and a first top detent element juxtaposed with the first detent plate, the first top detent element being adapted for selective engagement and disengagement with the first base detent element, so as to preclude movement of the top plate with respect to the base plate.

6. The roller mount for seats of claim 5, wherein:

the first detent plate is mounted for horizontal sliding movement toward the first base slide;

the first base detent element further comprises a first base rack gear integral with the first base slide, the first base rack gear extending in a longitudinal direction, the first base rack gear having teeth extending upward; and the first top detent element further comprises a first top rack gear integral with the first detent plate, the first top rack gear extending in a longitudinal direction, the first top rack gear having teeth extending upward, the first top rack gear being adapted for selective releasable engagement with the first base rack gear, so as to preclude movement of the first top slide with respect to the first base slide when the first top rack gear is engaged, and to allow movement of the first top slide with respect to the first base slide when the first top rack gear is disengaged.

7. The roller mount for seats of claim 6, wherein:

the first base rack gear teeth extend upward and inward toward the longitudinal axis at a primary predetermined angle with the base plane; and the first top rack gear teeth extend upward and inward toward the longitudinal axis at the primary predetermined angle with the base plane; wherein the first base rack gear teeth and the first top rack gear teeth will engage horizontally, causing a downward vector force to be generated by the primary predetermined angle, thereby eliminating backlash between the first top detent element and the first base detent element.

8. The roller mount for seats of claim 7, further comprising:

a first locking bar extending longitudinally adjacent a one of the first base rack gear and the first top rack gear; and an opposite one of the first base rack gear and the first top rack gear includes a first locking slot extending longitudinally and adapted for engagement with the first locking bar, so as to guide the first top rack gear teeth into engagement with the first base rack gear teeth; wherein the downward vector force will eliminate backlash between the first locking bar and the first locking slot.

9. The roller mount for seats of claim 5, further comprising:
   a second base slide mounted on the base plate parallel to the first base slide and spaced apart from the first base slide and extending in a longitudinal direction;
   a second base detent element juxtaposed with the base plate;
   a second top slide adapted for engagement with the second base slide, the second top slide being adapted for movement in a longitudinal direction;
   a plurality of top rollers bearing against the second top slide for rolling engagement with the second base slide, the top rollers being disposed bearing downward against the second base slide, so as to resist downward forces against the second base slide;
   a plurality of side rollers bearing against the second top slide for rolling engagement with the second base slide, the side rollers being disposed bearing transversely against the second base slide, so as to resist transverse forces against the second base slide;
   the top plate being mounted on the second top slide;
   a second detent plate juxtaposed with the top plate; and
   a second top detent element juxtaposed with the second detent plate, the second top detent element being adapted for selective engagement and disengagement with the second base detent element, so as to preclude movement of the top plate with respect to the base plate.

10. The roller mount for seats of claim 9, wherein:
    the second detent plate is mounted for horizontal sliding movement toward the second base slide;
    the second base detent element further comprises a second base rack gear integral with the second base slide, the second base rack gear extending in a longitudinal direction, the second base rack gear having teeth extending upward; and
    the second top detent element further comprises a second top rack gear integral with the second detent plate, the second top rack gear extending in a longitudinal direction, the second top rack gear having teeth extending upward, the second top rack gear being adapted for selective releasable engagement with the second base rack gear, so as to preclude movement of the second top slide with respect to the second base slide when the second top rack gear is engaged, and to allow movement of the second top slide with respect to the second base slide when the second top rack gear is disengaged.

11. The roller mount for seats of claim 10, wherein:
    the second base rack gear teeth extend upward and inward toward the longitudinal axis at a primary predetermined angle with the base plane; and
    the second top rack gear teeth extend upward and inward toward the longitudinal axis at the primary predetermined angle with the base plane; wherein
    the second base rack gear teeth and the second top rack gear teeth will engage horizontally, causing a downward vector force to be generated by the primary predetermined angle, thereby eliminating backlash between the second top detent element and the second base detent element.

12. The roller mount for seats of claim 11, further comprising:
    a second locking bar extending longitudinally adjacent a one of the second base rack gear and the second top rack gear; and
    an opposite one of the second base rack gear and the second top rack gear includes a second locking slot extending longitudinally and adapted for engagement with the second locking bar, so as to guide the second top rack gear teeth into engagement with the second base rack gear teeth; wherein
    the downward vector force will eliminate backlash between the second locking bar and the second locking slot.

13. The roller mount for seats of claim 9, further comprising:
    a release cable extending between the first and second detent plates;
    a release handle extending from a proximal end attached to the release cable to a distal end projecting outward from the roller mount and adapted for manual grasping, the release the handle being mounted for movement on a one of the base plate and the top plate; wherein
    the release handle will be manually grasped and moved, the release cable will be pulled, the first top detent element will be disengaged with the first base detent element, and the second top detent element will be disengaged with the second base detent element, so as to allow the seat to be moved.

14. The roller mount for seats of claim 13, further comprising:
    a central pulley mounted for engagement with the release cable;
    the release handle being mounted for pivotal movement on the top plate with the proximal end attached to the central pulley; wherein
    the release handle will be manually grasped and pivoted, the central pulley will pull the release cable, the first and second top detent elements will be disengaged with the first and second base detent elements respectively, so as to allow the seat to be moved.

15. The roller mount for seats of claim 14, further comprising:
    a first housing attached to the top plate, the first housing having a pocket, the first detent plate being received in the pocket for sliding movement transversely toward the first base slide, so as to allow said selective engagement and disengagement of the first top detent element with the first base detent element;
    at least one first detent spring disposed between the first housing and the first detent plate so as to bias the first top detent element toward the first base detent element;
    a second housing attached to the top plate, the second housing having a pocket, the second detent plate being received in the pocket for sliding movement transversely toward the second base slide, so as to allow said selective engagement and disengagement of the second top detent element with the second base detent element; and
    at least one second detent spring disposed between the second housing and the second detent plate so as to bias the second top detent element toward the second base detent element.

16. The roller mount for seats of claim 15, wherein:
    the side rollers bearing against the first top slide extend upward and inward toward the longitudinal axis at a secondary predetermined angle with the base plane for rolling contact between the first top slide and the first base slide, so as to resist transverse forces and upward forces against the first base slide; and the side rollers bearing against the second top slide extend upward and inward toward the longitudinal axis at the secondary predetermined angle with the base plane for rolling contact between the second top slide and the second base slide, so as to resist transverse forces and upward forces against the second base slide.

17. A roller mount for seats for use in connection with a boat and a seat, the roller mount having a central longitudinal axis, the roller mount for seats comprising:

a base plate, the base plate being adapted for mounting in the boat;

a first base slide mounted on the base plate;

a second base slide mounted on the base plate parallel to the first base slide and spaced apart from the first base slide;

a first base detent element having a first base rack gear integral with the first base slide, the first base rack gear extending in a longitudinal direction, the first base rack gear having teeth extending upward;

a second base detent element having a second base rack gear integral with the second base slide, the second base rack gear extending in a longitudinal direction, the second base rack gear having teeth extending upward;

a first top slide mounted for linear movement with respect to the first base slide in a longitudinal direction;

a plurality of top rollers bearing against the first top slide for rolling engagement with the first base slide, the top rollers being disposed bearing downward against the first base slide, so as to resist downward forces against the first base slide;

a plurality of side rollers bearing against the first top slide for rolling engagement with the first base slide, the side rollers being disposed bearing transversely against the first base slide, so as to resist transverse forces against the first base slide;

a second top slide mounted for linear movement with respect to the second base slide in a longitudinal direction;

a plurality of top rollers bearing against the second top slide for rolling engagement with the second base slide, the top rollers being disposed bearing downward against the second base slide, so as to resist downward forces against the second base slide;

a plurality of side rollers bearing against the second top slide for rolling engagement with the second base slide, the side rollers being disposed bearing transversely against the second base slide, so as to resist transverse forces against the second base slide;

a top plate mounted on the first and second top slides, the top plate being adapted to support the seat;

a first detent plate mounted for horizontal sliding movement toward the first base slide, the first detent plate having a first top detent element juxtaposed with the top plate, the first top detent element including a first top rack gear integral with the first detent plate, the first top rack gear extending in a longitudinal direction, the first top rack gear having teeth extending upward, the first top rack gear being adapted for selective releasable engagement with the first base rack gear, so as to preclude movement of the first top slide with respect to the first base slide when the first top rack gear is engaged, and to allow movement of the first top slide with respect to the first base slide when the first top rack gear is disengaged; and a second detent plate mounted for horizontal sliding movement toward the second base slide, the second detent plate having a second top detent element juxtaposed with the top plate, the second top detent element including a second top rack gear integral with the second detent plate, the second top rack gear extending in a longitudinal direction, the second top rack gear having teeth extending upward, the second top rack gear being adapted for selective releasable engagement with the second base rack gear, so as to preclude movement of the second top slide with respect to the second base slide when the second top rack gear is engaged, and to allow movement of the second top slide with respect to the second base slide when the second top rack gear is disengaged.

18. The roller mount for seats of claim 17, wherein:

the first base rack gear teeth extend upward and inward toward the longitudinal axis at a primary predetermined angle with the base plane;

the first top rack gear teeth extend upward and inward toward the longitudinal axis at the primary predetermined angle with the base plane;

the second base rack gear teeth extend upward and inward toward the longitudinal axis at a primary predetermined angle with the base plane; and the second top rack gear teeth extend upward and inward toward the longitudinal axis at the primary predetermined angle with the base plane; wherein the first base rack gear teeth and the first top rack gear teeth will engage horizontally, causing a downward vector force to be generated, thereby eliminating backlash between the first top detent element and the first base detent element; and the second base rack gear teeth and the second top rack gear teeth will engage horizontally, causing a downward vector force to be generated, thereby eliminating backlash between the second top detent element and the second base detent element.

19. The roller mount for seats of claim 18, further comprising:

a first locking bar extending longitudinally adjacent the first base rack gear;

the first top rack gear includes a first locking slot extending longitudinally and adapted for engagement with the first locking bar, so as to guide the first top rack gear teeth into engagement with the first base rack gear teeth, whereby the downward vector force will eliminate backlash between the first locking bar and the first locking slot;

a second locking bar extending longitudinally adjacent the second base rack gear; and the second top rack gear includes a second locking slot extending longitudinally and adapted for engagement with the second locking bar, so as to guide the second top rack gear teeth into engagement with the second base rack gear teeth, whereby the downward vector force will eliminate backlash between the second locking bar and the second locking slot.

20. The roller mount for seats of claim 19, further comprising:

a release cable extending between the first and second detent plates;

a central pulley mounted for engagement with the release cable;

a release handle mounted for pivotal movement on the top plate, the release handle extending from a proximal end attached to the central pulley to a distal end projecting outward from the roller mount and adapted for manual grasping, wherein the release handle will be manually grasped and pivoted, the central pulley will pull the release cable, the first and second top detent elements will be disengaged with the first and second base detent elements respectively, so as to allow the seat to be moved.

21. The roller mount for seats of claim 20, further comprising:
a first housing attached to the top plate, the first housing having a pocket, the first detent plate being received in the pocket for sliding movement transversely toward the first base slide, so as to allow said selective engagement and disengagement of the first top detent element with the first base detent element;
a plurality of first detent springs disposed between the first housing and the first detent plate so as to bias the first top detent element toward the first base detent element;
a second housing attached to the top plate, the second housing having a pocket, the second detent plate being received in the pocket for sliding movement transversely toward the second base slide, so as to allow said selective engagement and disengagement of the second top detent element with the second base detent element; and
a plurality of second detent springs disposed between the second housing and the second detent plate so as to bias the second top detent element toward the second base detent element.

22. The roller mount for seats of claim 21, wherein:
the side rollers bearing against the first top slide extend upward and inward toward the longitudinal axis at a secondary predetermined angle with the base plane for rolling contact between the first top slide and the first base slide, so as to resist transverse forces and upward forces against the first base slide; and
the side rollers bearing against the second top slide extend upward and inward toward the longitudinal axis at the secondary predetermined angle with the base plane for rolling contact between the second top slide and the second base slide, so as to resist transverse forces and upward forces against the second base slide.

* * * * *